US009582602B2

(12) United States Patent
Owens et al.

(10) Patent No.: US 9,582,602 B2
(45) Date of Patent: Feb. 28, 2017

(54) SYSTEMS AND METHODS FOR IMPROVING ACCESS TO SYNDICATION FEEDS IN NETWORK BROWSING APPLICATIONS

(75) Inventors: Stephen Owens, Marietta, GA (US); James Bollas, Columbus, OH (US); Michael Wolford, Roswell, GA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 852 days.

(21) Appl. No.: 11/261,672

(22) Filed: Oct. 31, 2005

(65) Prior Publication Data

US 2006/0265518 A1 Nov. 23, 2006

Related U.S. Application Data

(60) Provisional application No. 60/681,458, filed on May 17, 2005.

(51) Int. Cl.
*G06F 17/30* (2006.01)
*H04L 29/08* (2006.01)

(52) U.S. Cl.
CPC ... *G06F 17/30896* (2013.01); *G06F 17/30867* (2013.01); *H04L 67/306* (2013.01)

(58) Field of Classification Search
CPC .................. G06F 17/30873; G06F 17/30867; G06F 17/30884; H04L 67/26; H04L 67/306; Y10S 707/943
USPC .............................................. 709/246; 707/10
See application file for complete search history.

(56) References Cited

U.S. PATENT DOCUMENTS

| 5,917,491 | A | 6/1999 | Bauersfeld | |
|---|---|---|---|---|
| 5,987,402 | A | 11/1999 | Murata et al. | |
| 6,061,738 | A | 5/2000 | Osaku et al. | |
| 6,088,731 | A * | 7/2000 | Kiraly et al. | 709/229 |
| 6,091,409 | A | 7/2000 | Dickman et al. | |
| 6,195,707 | B1 | 2/2001 | Minh | |
| 6,237,030 | B1 * | 5/2001 | Adams et al. | 709/218 |
| 6,266,060 | B1 | 7/2001 | Roth | |
| 6,297,819 | B1 | 10/2001 | Furst | |
| 6,308,212 | B1 | 10/2001 | Besaw et al. | |
| 6,338,033 | B1 | 1/2002 | Bourbonnais et al. | |
| 6,427,175 | B1 * | 7/2002 | Khan et al. | 709/245 |
| 6,460,036 | B1 * | 10/2002 | Herz | 707/748 |

(Continued)

OTHER PUBLICATIONS

Bloglines, Oct. 12, 2003, Trustic Inc, http://web.archive.org/web/20031012011958/http://bloglines.com/.*

(Continued)

*Primary Examiner* — Eric Wiener
(74) *Attorney, Agent, or Firm* — James J. DeCarlo; Greenberg Traurig LLP

(57) ABSTRACT

A browsing application includes instructions for identifying and subscribing to a syndication feed delivered over a network. The instructions include code for analyzing a page of data that has been retrieved over the network by a browsing application to determine the availability of the syndication feed, code for causing a user interface element to be displayed on the browsing application, the user interface element indicating the availability of the syndication feed, and code for responding to a user's selection of the user interface element by causing the browsing application to display a page which permits the user to subscribe to the syndication feed.

28 Claims, 5 Drawing Sheets

(56) References Cited

U.S. PATENT DOCUMENTS

| | | | |
|---|---|---|---|
| 6,476,833 B1* | 11/2002 | Moshfeghi | 715/854 |
| 6,535,912 B1 | 3/2003 | Anupam et al. | |
| 6,628,311 B1 | 9/2003 | Fang | |
| 6,643,661 B2* | 11/2003 | Polizzi et al. | 707/709 |
| 6,826,540 B1 | 11/2004 | Plantec et al. | |
| 6,832,263 B2* | 12/2004 | Polizzi et al. | 709/246 |
| 6,857,022 B1 | 2/2005 | Scanlan | |
| 6,918,090 B2* | 7/2005 | Hesmer et al. | 715/760 |
| 6,993,473 B2 | 1/2006 | Cartus | |
| 7,020,696 B1 | 3/2006 | Perry et al. | |
| 7,058,726 B1 | 6/2006 | Osaku et al. | |
| 7,103,642 B1* | 9/2006 | Chen et al. | 709/218 |
| 7,124,185 B2 | 10/2006 | Kuroyanagi | |
| 7,185,044 B2 | 2/2007 | Ryan et al. | |
| 7,194,552 B1 | 3/2007 | Schneider | |
| 7,216,292 B1 | 5/2007 | Snapper et al. | |
| 7,228,493 B2* | 6/2007 | Kosak et al. | 715/234 |
| 7,277,718 B2 | 10/2007 | Wong | |
| 7,278,092 B2 | 10/2007 | Krzanowski | |
| 7,281,049 B2 | 10/2007 | Verma et al. | |
| 7,293,019 B2* | 11/2007 | Dumais et al. | 707/5 |
| 7,512,710 B2 | 3/2009 | Allen et al. | |
| 7,580,960 B2 | 8/2009 | Travieso et al. | |
| 7,644,018 B1* | 1/2010 | Yukie et al. | 705/34 |
| 7,810,036 B2* | 10/2010 | Bales et al. | 715/742 |
| 7,970,889 B2* | 6/2011 | Bennett et al. | 709/224 |
| 8,738,655 B2* | 5/2014 | Torres | 707/795 |
| 2001/0029455 A1 | 10/2001 | Chin et al. | |
| 2001/0041578 A1 | 11/2001 | Na | |
| 2002/0024536 A1* | 2/2002 | Kahan et al. | 345/745 |
| 2002/0042799 A1* | 4/2002 | Slotznick | 707/501.1 |
| 2002/0138331 A1* | 9/2002 | Hosea et al. | 705/10 |
| 2002/0194267 A1* | 12/2002 | Flesner et al. | 709/203 |
| 2002/0194300 A1 | 12/2002 | Lin et al. | |
| 2003/0090516 A1* | 5/2003 | Stein | 345/745 |
| 2003/0101116 A1* | 5/2003 | Rosko et al. | 705/35 |
| 2003/0104827 A1 | 6/2003 | Moran et al. | |
| 2003/0174154 A1* | 9/2003 | Yukie et al. | 345/700 |
| 2003/0221167 A1 | 11/2003 | Goldstein et al. | |
| 2004/0030744 A1* | 2/2004 | Rubin et al. | 709/203 |
| 2004/0044518 A1 | 3/2004 | Reed et al. | |
| 2004/0070605 A1* | 4/2004 | Huang et al. | 345/744 |
| 2004/0098360 A1* | 5/2004 | Witwer et al. | 707/1 |
| 2004/0098451 A1* | 5/2004 | Mayo | 709/203 |
| 2004/0098467 A1* | 5/2004 | Dewey et al. | 709/219 |
| 2004/0102201 A1 | 5/2004 | Levin | |
| 2004/0102956 A1 | 5/2004 | Levin | |
| 2004/0193597 A1 | 9/2004 | Johnson | |
| 2004/0225749 A1* | 11/2004 | Pavlik et al. | 709/245 |
| 2004/0230947 A1* | 11/2004 | Bales et al. | 717/110 |
| 2005/0097180 A1* | 5/2005 | Abdelhak | 709/208 |
| 2005/0097190 A1* | 5/2005 | Abdelhak | 709/217 |
| 2005/0131778 A1* | 6/2005 | Bennett et al. | 705/29 |
| 2005/0132067 A1* | 6/2005 | Bennett et al. | 709/228 |
| 2005/0216834 A1 | 9/2005 | Gu | |
| 2005/0216837 A1* | 9/2005 | Washburn | 715/708 |
| 2005/0267973 A1* | 12/2005 | Carlson et al. | 709/228 |
| 2005/0289147 A1* | 12/2005 | Kahn et al. | 707/10 |
| 2005/0289468 A1* | 12/2005 | Kahn et al. | 715/738 |
| 2006/0004799 A1* | 1/2006 | Wallender | 707/100 |
| 2006/0004830 A1* | 1/2006 | Lora et al. | 707/102 |
| 2006/0047649 A1 | 3/2006 | Liang | |
| 2006/0053376 A1* | 3/2006 | Ng et al. | 715/742 |
| 2006/0085741 A1 | 4/2006 | Weiner et al. | |
| 2006/0167860 A1* | 7/2006 | Eliashberg et al. | 707/3 |
| 2006/0173985 A1* | 8/2006 | Moore | 709/223 |
| 2006/0200740 A1* | 9/2006 | Kahn et al. | 715/500 |
| 2006/0218479 A1* | 9/2006 | Torres | 715/500 |
| 2006/0253459 A1* | 11/2006 | Kahn et al. | 707/10 |
| 2006/0253567 A1* | 11/2006 | Selin | H04L 65/1006 709/224 |
| 2006/0265472 A1 | 11/2006 | Seitz et al. | |
| 2006/0265481 A1 | 11/2006 | Seitz et al. | |
| 2006/0265652 A1 | 11/2006 | Seitz et al. | |
| 2007/0073701 A1* | 3/2007 | Miller et al. | 707/10 |
| 2007/0106627 A1* | 5/2007 | Srivastava et al. | 706/20 |
| 2007/0174286 A1 | 7/2007 | Seitz et al. | |
| 2007/0220441 A1 | 9/2007 | Melton et al. | |
| 2008/0133487 A1 | 6/2008 | Gross et al. | |
| 2008/0275967 A1 | 11/2008 | Borman et al. | |

OTHER PUBLICATIONS

Molly Montgomery, RSS Tutorial, Dec. 2003, The Lone Star Librarian, Volumn 56:2, pp. 1-6.*
Bloglines, Help: Frequently Asked Questions, Oct. 12, 2003, Trustic Inc, http://web.archive.org/web/20030731104405/bloglines.com/help/faq.*
My Yahoo!, RSS Headlines Module—Frequently Asked Questions, Jan. 24, 2004, http://web.archive.org/web/20040124175747/http://my.yahoo.com/s/rss-faq.html.*
Mark Pilgrim, autorss.py, Dec. 17, 2002.*
Alan Levine, Pssss . . . Have You Heard About RSS?, Dec. 1, 2003, mcli Forum, vol. 6, pp. 8-11.*
"Syndication Subscription Service", Morten Frederiksen, Apr. 6, 2004, http://web.archive.org/web/20040406004838/http://xml.mfd-consult.dk/syn-sub/.*
"Welcome to My Yahoo!", Yahoo! Inc., May 11, 2004, http://web.archive.org/web/20040511224239/http://www.yahoo.com/_ylh=X3oDMTB1c2ZmZzF2BF9TAzl3MTYxNDkEdGVzdAMw-BHRtcGwDbnMtYmV0YQ--/r/i1.*
"My Yahoo!, RSS Headlines Module—Frequently Asked Questions"; Jan. 24, 2004; <http://web.archive.org/web/20040124175747/http://my.yahoo.com/s/rss-faq.html>; retrieved on Sep. 10, 2007 and Nov. 5, 2015; 9 pages.*
M. Pilgrim (IBM), P. Ringnalda, Ed. "Atom Feed Autodiscovery", pp. 1-14, May 10, 2005, at http://www.ietf.org/internet-drafts/draft-ietf-atompub-autodiscovery-01.txt.
J. Gregorio, Ed. (BitWorking, Inc.), B. de hOra, Ed. (Propylon Ltd.), "The Atom Publishing Protocol", pp. 1-40, Oct. 11, 2005, at http://www.ietf.org/internet-drafts/draft-ietf-atompub-protocol-05.txt.
M. Nottingham, Ed., R. Sayre, Ed., "The Atom Syndication Format", pp. 1-53, Aug. 15, 2005, at http://www.ietf.org/internet-drafts/draft-ietf-atompub-format-11.txt.
Dave Winer, "RSS 2.0 Specification", pp. 1-10, Jan. 30, 2005, at http://blogs.law.harvard.edu/tech/rss.
"What is RSS: A tutorial introduction to feeds and aggregators", pp. 1-4, Jul. 6, 2004, © 2004 Software Garden, Inc., at http://rss.softwaregarden.com/aboutrss.html.
International Search Report (PCT/US06/12023).
Wikipedia, Homepage, Jan. 4, 2004.
Windows NT 4 desktop, 1996.
Windows 95 Internet explorer, 1995.
Lock Your IE Homepage, Jul. 11, 2003.
Phoenix 0.5 Naples, 2002.
Mozilla 1.5 home page, Nov. 18, 2003.
RSS and Live Bookmarks, Apr. 6, 2005.
Official Action from the United States Patent and Trademark Office for U.S. Appl. No. 11/251,784 dated May 12, 2009.
Official Action from the United States Patent and Trademark Office for U.S. Appl. No. 11/251,784 dated Nov. 12, 2008.
Official Action from the United States Patent and Trademark Office for U.S. Appl. No. 11/251,784 dated Jul. 22, 2008.
Official Action from the United States Patent and Trademark Office for U.S. Appl. No. 11/251,784 dated Feb. 5, 2008.
Official Action from the United States Patent and Trademark Office for U.S. Appl. No. 11/261,675 dated Aug. 4, 2009.
Official Action from the United States Patent and Trademark Office for U.S. Appl. No. 11/261,675 dated Mar. 4, 2009.
Official Action from the United States Patent and Trademark Office for U.S. Appl. No. 11/434,935 dated Jul. 8, 2009.
Official Action from the United States Patent and Trademark Office for U.S. Appl. No. 11/434,935 dated Dec. 8, 2008.
Official Action from the United States Patent and Trademark Office for U.S. Appl. No. 11/434,893 dated Mar. 18, 2009.
Official Action from the United States Patent and Trademark Office for U.S. Appl. No. 11/434,893 dated Dec. 11, 2008.

(56) References Cited

OTHER PUBLICATIONS

Official Action from the United States Patent and Trademark Office for U.S. Appl. No. 11/434,893 dated May 5, 2008.
Official Action from the United States Patent and Trademark Office for U.S. Appl. No. 11/434,893 dated Sep. 2, 2009.
Official Action issued in connection with U.S. Appl. No. 11/251,784 mailed Sep. 17, 2010.
Official Action issued in connection with U.S. Appl. No. 11/251,784 mailed Apr. 1, 2010.
Official Action issued in connection with U.S. Appl. No. 11/251,784 mailed Oct. 21, 2009.
Official Action issued in connection with U.S. Appl. No. 11/261,675 mailed Sep. 16, 2010.
Official Action issued in connection with U.S. Appl. No. 11/261,675 mailed Jan. 21, 2010.
Official Action issued in connection with U.S. Appl. No. 11/434,935 mailed May 20, 2010.
Official Action issued in connection with U.S. Appl. No. 11/434,935 mailed Dec. 7, 2009.
Official Action issued in connection with U.S. Appl. No. 11/434,893 mailed Oct. 8, 2010.
Official Action issued in connection with U.S. Appl. No. 11/434,893 mailed Mar. 31, 2010.
Official Action issued in connection with U.S. Appl. No. 11/434,893 mailed Sep. 2, 2009.

* cited by examiner

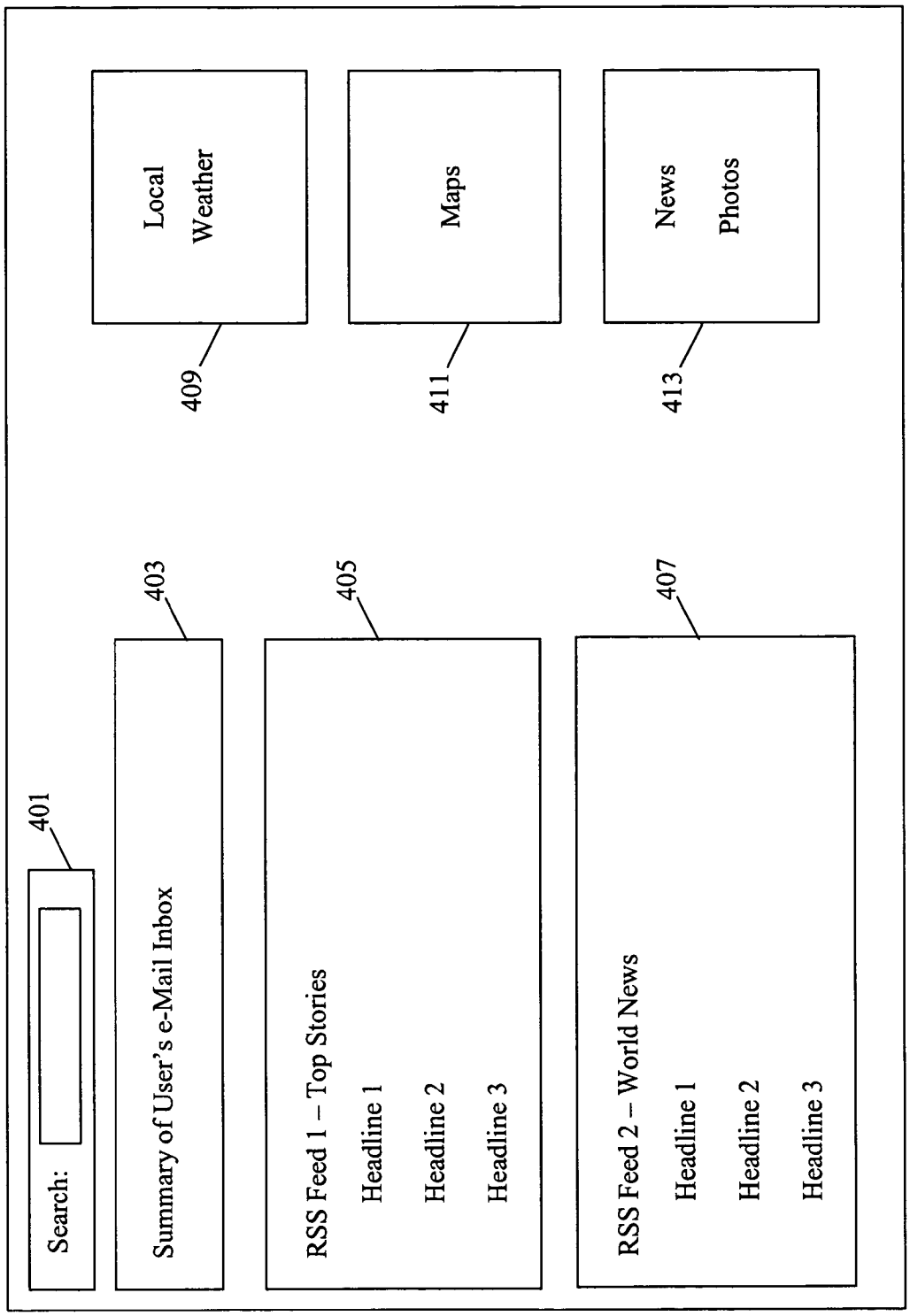

SYSTEMS AND METHODS FOR IMPROVING ACCESS TO SYNDICATION FEEDS IN NETWORK BROWSING APPLICATIONS

This application claims the benefit of U.S. Provisional Application Ser. No. 60/681,458 filed May 17, 2005 entitled Systems and Methods for Providing Features and User Interface in Network Browsing Applications, the disclosure of which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of network browsing-enabled applications, and in particular to systems and methods that provide for improved access to really simple syndication feeds in such applications.

BACKGROUND OF THE INVENTION

Network browsing applications allow a computer user to view the contents of a network. Some network browsing applications, like Windows Explorer distributed by the Microsoft Corporation of Redmond, Wash., focus on specific types of networks and/or files. For example, Windows Explorer is primarily oriented toward browsing files in a local area network. Other network browsing applications, such as Netscape Navigator, distributed by Netscape Corporation of Mountain View, Calif., or Internet Explorer, distributed by the Microsoft Corporation, allow users to install "plug-in" applications that allow the network browsing application to work with additional file types. Additional examples of network browsing applications, also referred to herein as "browsing applications" for simplicity, include, without limitation, internet browsers, mail programs with browsing capabilities, file-sharing applications, and any application which provides the capability to browse resources either on an external network (e.g., the internet) or an internal network. Such applications may be separate from or integrated into an operating system.

Some web sites that can be accessed by network browsing application include content that changes over time. Examples of such web sites include news sites, such as CNN.com or FoxNews.com, as well as blogs, weather sites, discussion forums, project status sites, and the like. Some network users are members of projects or forums related to a particular topic, or may merely be interested in tracking changes to a particular site (e.g., breaking news stories). For at lest the last decade, the only way to monitor changes to a particular site was to visit all site's pages on a regular basis. However, a relatively new technology, referred to as "syndication", allows a network user to easily view, and even receive, content changes made since the network user last visited the site. A high-level description of one syndication technology, known as Really Simple Syndication or RSS, is provided at http://rss.softwaregarden.com/aboutrss.html, which is incorporated herein by reference in its entirety. The specification for RSS 2.0 can be found at http://blogs.law.harvard.edu/tech/rss, and is incorporated herein by reference in its entirety. An alternative syndication technology, known as Atom, is described in a series of Internet Drafts submitted to the Internet Engineering Task Force (IETF) which can be reviewed at http://www.ietf.org/internet-drafts/draft-ietf-atompub-format-11.txt, http://www.ietf.org/internet-drafts/draft-ietf-atompub-protocol-05.txt, and http://www.ietf.org/internet-drafts/draft-ietf-atompub-autodiscovery-01.txt, the contents of which are incorporated by reference herein in their entirety.

To view the changes to a site as published using a syndication technology, the network user must utilize a network browsing application compatible with the syndication technology implemented by the site. As the number of syndication technologies increases, and as the technologies mature, network users are likely to become frustrated with individual network browsing applications unless the network users constantly upgrade their software.

What is needed is a means through which network users can more readily subscribe to and browse a syndication feed.

SUMMARY OF THE INVENTION

Accordingly, the present invention is directed to systems and methods for improving access to syndication feeds that substantially obviate one or more of the problems due to limitations and disadvantages of the related art.

In one embodiment, a computer-readable storage medium containing a set of instructions for a general purpose computer is provided for identifying and subscribing to a syndication feed delivered over a network. The instructions include code for analyzing a page of data that has been retrieved over the network by a browsing application to determine availability of the syndication feed, and code for causing a user interface element to be displayed on the browsing application, the user interface element indicating the availability of the syndication feed. Code may further be provided for responding to a user's selection or activation of the user interface element by causing the browsing application to display a page which permits the user to subscribe to the syndication feed. Alternatively, selection or activation of the user interface element causes subscription to the syndication feed. The code may be provided in the form of a plugin to a browsing application, source code integrated into the browsing application at the source code level, or a combination thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

FIG. 5 is a block diagram illustrating an exemplary

DETAILED DESCRIPTION OF THE PREFERRED EMBODIMENTS

Reference will now be made in detail to the preferred embodiments of the present invention, examples of which are illustrated in the accompanying drawings.

Services such as my.yahoo.com allow users to select web pages, portions of web pages, syndication feeds, search boxes, and other content from anywhere on the internet for inclusion in the customized home page. Thereafter, when the user visits his or her customized home page, any syndication feed selected for inclusion appears on that page along with any other content such as news pages, search fields, or the like, selected for inclusion in the home page by the user. The user can set the default home page of his browser to such a customized web page so that the customized web page loads when the browser is opened.

The embodiments of the invention disclosed herein relate to improved functionality and user interface features for network browsing-enabled applications. Such applications, referred to herein as "browsing applications," include, e.g., internet browsers, mail programs with browsing capabilities, file-sharing applications, and any application which provides the capability to browse resources either on an external network (e.g., the internet) or an internal network. Such applications may be separate from or integrated into an operating system.

a time of day, or the like. For load-balancing or other purposes, feed downloads can be limited to occurring only a certain number of times per day, hour, minute, or the like. Triggering events can occur on the client or on a server, and the feed can be requested by the client or pushed to the client from a server. In this respect, "client" as used herein can be either a client browsing application such as a web browser or a client machine in general. An example of a download feed is provided in Appendix A and discussed in further detail below.

Figure 1:
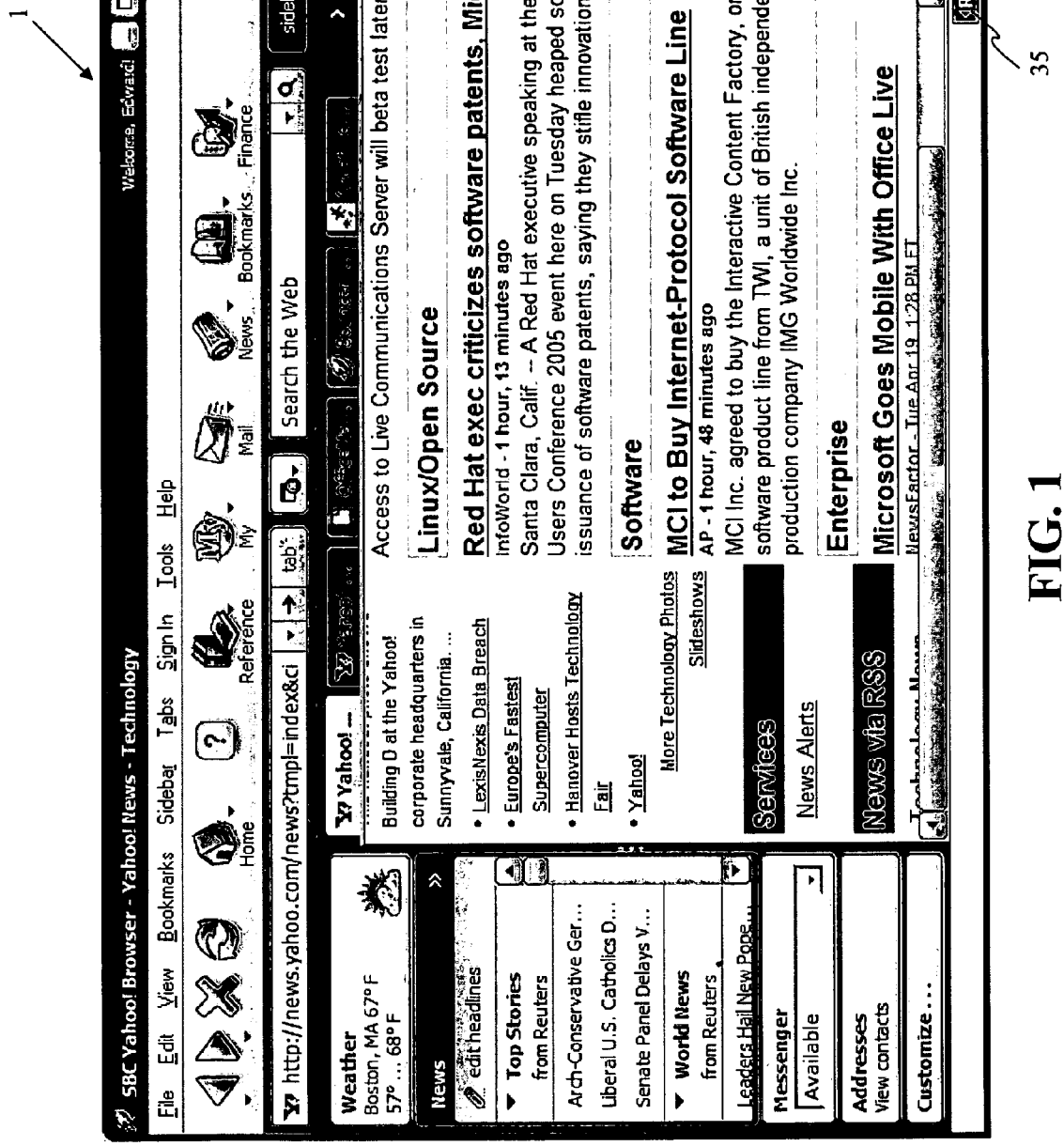
FIG. 1 is a screen capture of an exemplary embodiment of the invention illustrating the integration of a syndication subscription button into a browsing application.

FIG. 1 illustrates embodiments wherein browsing application 1 is configured to display a syndication subscription button 35 or other such user interface element when such subscriptions are supported by the site being visited. Such a button may be displayed, for example, in the lower right-hand corner of the application's window. In one embodiment, when a page is loaded into browsing application 1, browsing application 1 analyzes the page to determine whether a syndication feed is available via the page. By way of example, without intending to limit the present invention, one embodiment can search the source of the page for <link> tags with types "application/rss+xml", "application/atom+xml", or "application/x.atom+xml". In this embodiment, if a web page having a header similar to the header set forth in Table 1 were analyzed, the page would be identified as having at least one syndication feed available therein.

TABLE 1

```
<!DOCTYPE HTML PUBLIC "-//W3C//DTD HTML 4.01 Transitional//EN">
<html>
<head>
<title>Top Stories News on Yahoo! News</title>
<META HTTP-EQUIV="refresh" CONTENT="300">
<meta http-equiv="content-type" content="text/html; charset=UTF-8" />
<meta name="description" content="Top Stories News on Yahoo! News">
<meta name="keywords" content="">
<link rel="stylesheet" type="text/css"
href="http://us.i1.yimg.com/us.yimg.com/lib/common/lsmfonts20040826.css" />
<!-- <link rel="stylesheet" type="text/css"
href="/v10/us/news/css/ynews_ns.css" /> -->
<style type="text/css"><!--@import
url("http://us.i1.yimg.com/news.yahoo.com/v10/us/news/css/ynews.css?v=111627 9561");--></style>
<link rel="alternate" type="application/rss+xml" title="Yahoo! News - Top Stories"
href="http://rss.news.yahoo.com/rss/topstories" />
<link rel="alternate" type="application/atom+xml" title="Yahoo! Sports - Top News"
href="http://sports.yahoo.com/top/rss.xml"/>
<link rel="alternate" type="application/x.atom+xml" title="Yahoo! Sports - Top News"
href="http://sports.yahoo.com/top/rss.xml"/>
</head>
```

Figure 4:
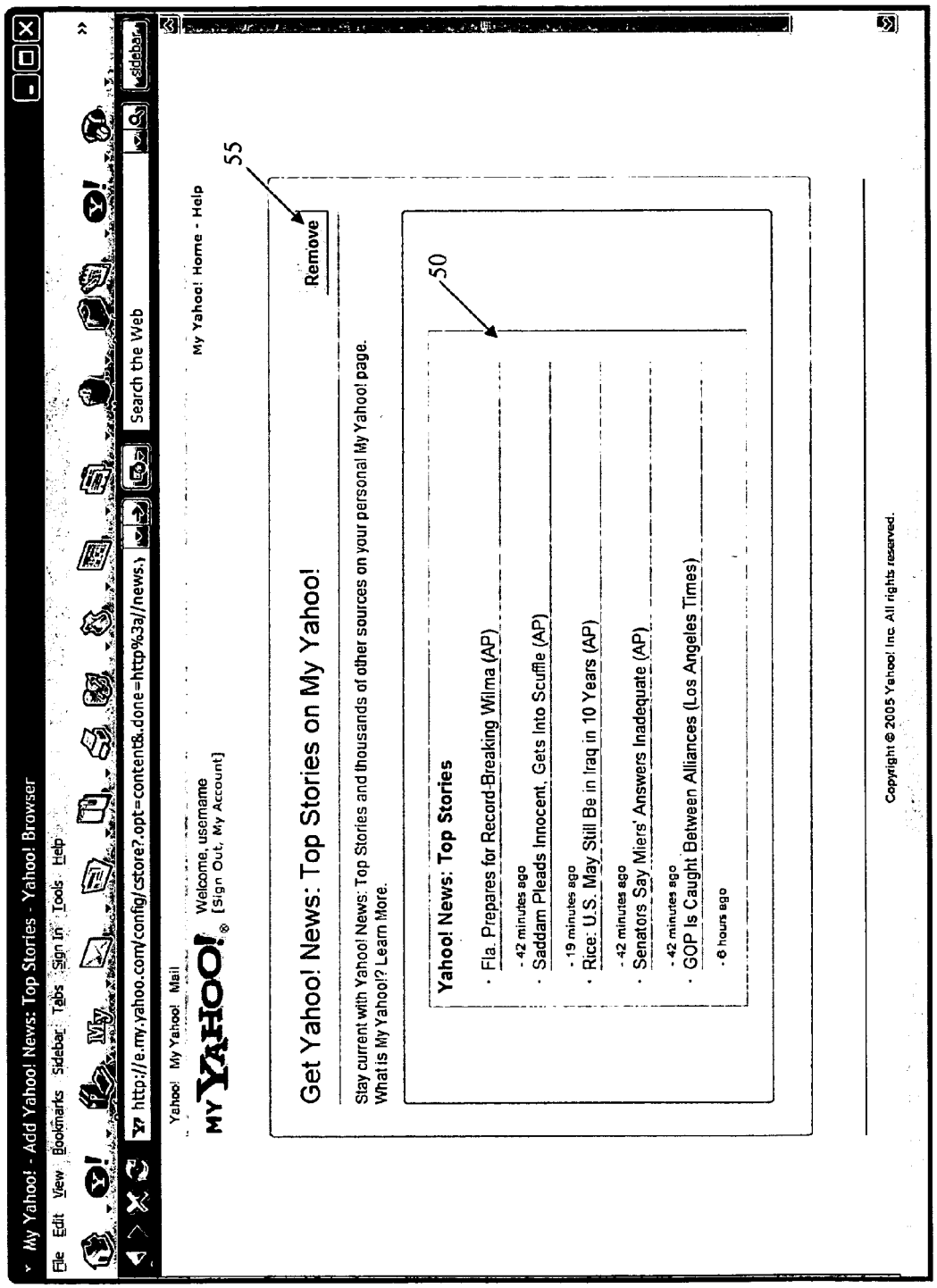
FIG. 4 is a screen capture of an exemplary embodiment of the invention illustrating a sample syndication feed subscription user interface.

The functionality of the embodiments described herein is provided in the form of add-ons or plug-ins to an existing browsing application such as a web browser, but can alternatively be provided in the form of features written into a browsing application at the application's source code level. In certain embodiments, one or more of the features or functionality described below are provided as a compiled dynamic link library (".dll.") file or series of compiled .dll files which are loaded at startup or runtime in connection with an existing browsing application so as to provide an improved user interface and/or additional functionality to the browsing application. As is set forth in further detail below, one or more of the features or functionality described below can be provided or customized by a feed such as an XML feed which is delivered to the browser upon the occurrence of a triggering event. Such triggering events can include, without limitation, the loading of the browser into the operating system, a change in user-specific parameters, Referring to FIG. 2, if browser application 1 identifies the site being viewed as supporting syndication, browsing application 1 can display user interface element 35. Upon selection or other activation of user interface element 35, browsing application 1 directs itself or a child window to a page on the network, such as, without limitation, a page on central server 12, which allows the network user to add the syndication feed to a customized home page. An exemplary embodiment of such a page is illustrated in FIG. 4, and includes a list of recently syndicated topics 50. The page preferably also allows the network user to cancel the subscription by clicking remove button 55 or another such user interface element.

Figure 2:
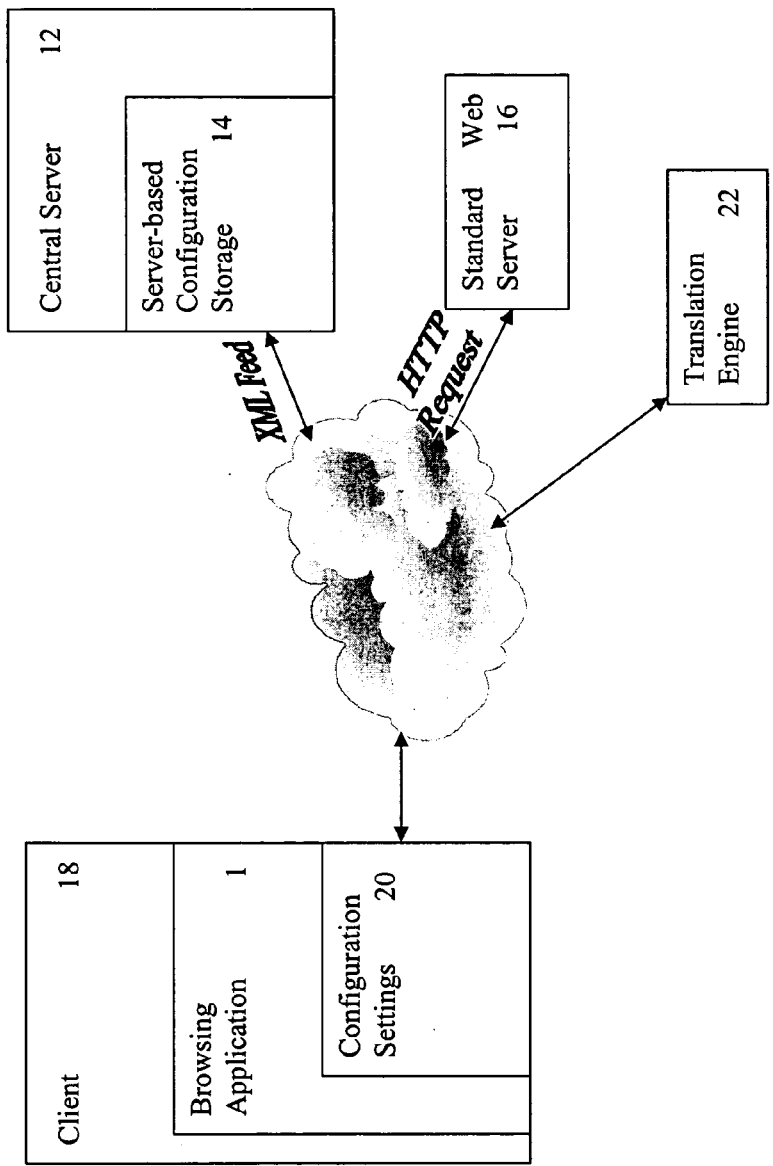
FIG. 2 is a block diagram illustrating an exemplary network architecture supporting the present invention.

Referring again to the embodiment illustrated in FIG. 2, the network user's settings are preferably stored in server-based configuration storage 14. Examples of a customized home page such as that supported by the present invention include, without limitation, the well-known my.yahoo.com, and the Outlook Today page displayed by Microsoft Outlook, published by Microsoft Corporation of Redmond, Wash. FIG. 5 shows an example of a customized home page which includes a search box 401, a summary of the user's e-mail inbox 403, first and second RSS feeds 405, 407, local weather 409, maps 411, and news photos 413. As shown, RSS feeds 405 and 407 have been subscribed to and appear on the user's customized home page.

In an alternative embodiment, activating user interface element 35 can cause browsing application 1 to transmit to central server 12 a URL containing information authenticating the network user and the syndication feed to which the network user wishes to be subscribed. The server can then add the syndication feed to the list of syndication feeds for the network user stored in server-based configuration storage 14.

In still another embodiment, browsing application 1 can retrieve configuration settings 20 from server-based configuration settings 14 when the network user logs into or is otherwise authenticated by central server 12. Such configuration settings may include, but are not limited to, the syndications feeds to which the network user has subscribed. Browsing application 1 can display the list of subscribed syndication feeds, thereby permitting the network user to unsubscribe to a syndication feed without having to access central server 12. Changes to configuration settings 20 can then be replicated to server-based configuration settings 14 in the background, or upon the occurrence of an event. Such events include, but are not limited to, when the network user closes browsing application 1.

Figure 3:
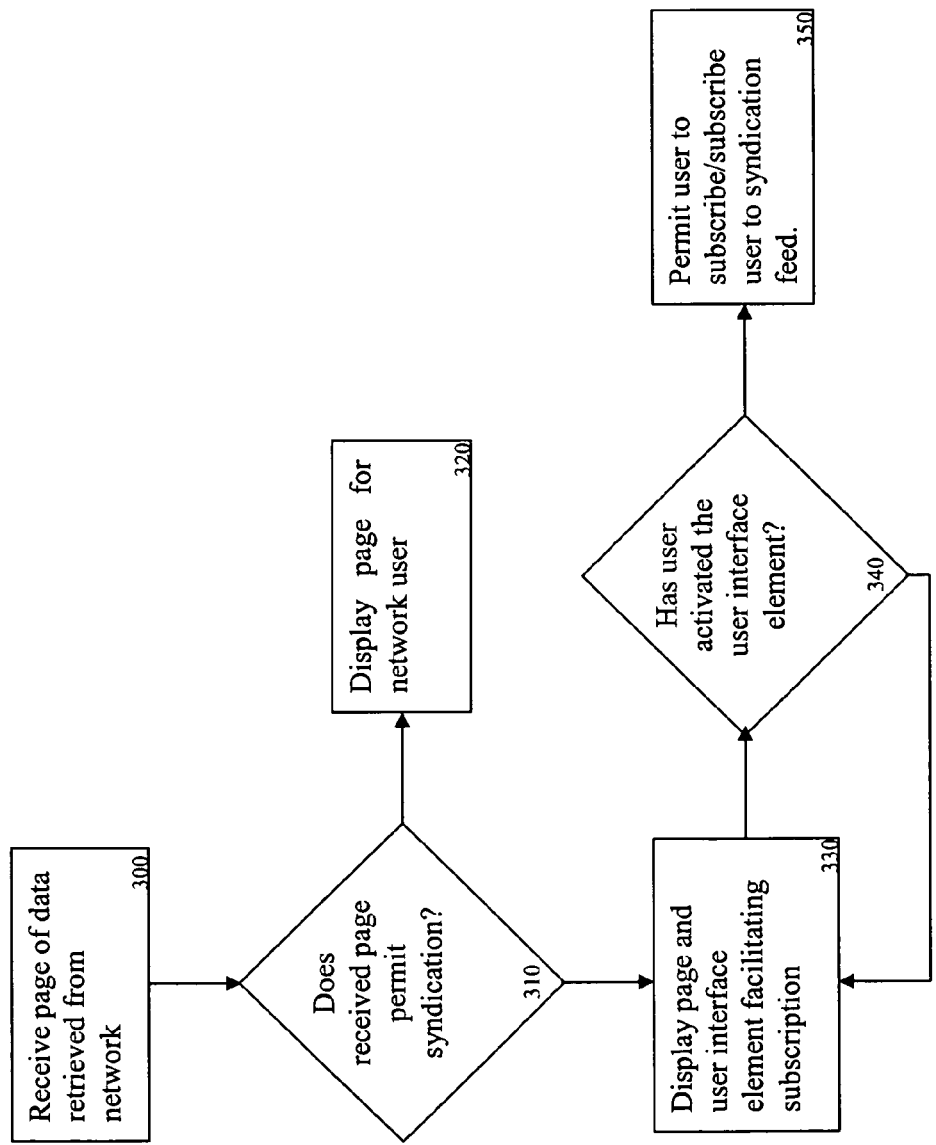
FIG. 3 is a block diagram illustrating an exemplary method for implementing the present invention.

FIG. 3 is a block diagram illustrating an exemplary method for implementing the present invention. In Block 300 of FIG. 3, the browsing application receives a page of data retrieved from the network. If the received page does not permit syndication (Block 310), the page is simply displayed for the user (Block 320). If the page does permit syndication (Block 330), the page is displayed along with a user interface element that facilitates subscribing to the syndication. If the user activates the user interface element (Block 340), the user is either automatically subscribed to the syndication feed or the browsing application is redirected to a page on the network that allows the user to subscribe to the syndication feed (Block 350).

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A non-transitory computer-readable storage medium tangibly encoded with computer executable code for execution by a computing device, comprising:
   code, executed by the computing device, for analyzing a page of data that has been retrieved over a network by a browsing application to determine the availability of a syndication feed;
   code, executed by the computing device, for searching source code associated with the page in order to determine that the page data supports the syndication feed;
   code, executed by the computing device, for causing a user interface element to be displayed in a user interface portion of said browsing application based on the determination that the page data supports the syndication feed, said user interface element indicating that a syndication feed is available;
   code, executed by the computing device, for responding to a user's selection of said user interface element by causing said browsing application to retrieve a page from a server and display the page in a content display area of said browsing application;
   code, executed by the computing device, for permitting said user to add said syndication feed to a user-specific customized home page having content therein from diverse user-selectable sources displayed on the user-specific customized home page based at least in part on authentication of the user with the server; and
   code, executed by the computing device, for displaying, upon initiation and loading of the browsing application for operation by an operating system hosting the browsing application, said syndication feed and the content from the diverse user-selectable sources within the user-specific customized home page based at least in part on user-specific configuration settings stored in server based configuration storage and retrieved based upon said user authentication, said displaying the user-specific customized home page comprises loading the syndication feed and the content from the diverse user-selectable sources during initiation of the browsing application, wherein the diverse user-selectable sources are loaded during initiation based upon a determination of the user's interactions with each source and the availability of each source.

2. The non-transitory computer-readable storage medium in accordance with claim 1, wherein said code for analyzing a page of data to determine the availability of the syndication feed comprises code for searching said page for a tag indicative of the availability of the syndication feed.

3. The non-transitory computer-readable storage medium in accordance with claim 2, wherein said tag is a link tag.

4. The non-transitory computer-readable storage medium in accordance with claim 2, wherein said tag is a tag indicating the availability of an RSS feed.

5. The non-transitory computer-readable storage medium in accordance with claim 2, wherein said tag is a tag indicating the availability of an atom feed.

6. The non-transitory computer-readable storage medium in accordance with claim 1, wherein said user interface element comprises a button.

7. The non-transitory computer-readable storage medium in accordance with claim 1, wherein said customized home page comprises a page which includes one or more search fields, one or more syndication feeds, and content from one or more web pages.

8. The non-transitory computer-readable storage medium in accordance with claim 1, wherein said page of data comprises data in a markup language.

9. The non-transitory computer-readable storage medium in accordance with claim 8, wherein said markup language is HTML.

10. The non-transitory computer-readable storage medium in accordance with claim 2, wherein said tag is a tag indicating the availability of a feed which is in an XML format.

11. The non-transitory computer-readable storage medium in accordance with claim 1, wherein said code for analyzing a page of data that has been retrieved over said network comprises a plugin to said browsing application.

12. The non-transitory computer-readable storage medium in accordance with claim 1, wherein said code for analyzing a page of data that has been retrieved over said network comprises code integrated into said browsing application at a source code level.

13. A non-transitory computer-readable storage medium tangibly encoded with computer executable code for execution by a computing device, comprising:
  code, executed by the computing device, for analyzing a page of data that has been retrieved over a network by a browsing application to determine the availability of a syndication feed;
  code, executed by the computing device, for searching source code associated with the page in order to determine that the page data supports the syndication feed;
  code, executed by the computing device, for causing a user interface element to be displayed on said browsing application based on the determination that the page data supports the syndication feed, said user interface element indicating that a syndication feed is available;
  code, executed by the computing device, for responding to a user's selection of said user interface element by subscribing to said syndication feed, said syndication feed is added to a user-specific customized home page that is loaded during initiation of the browsing application; and
  code, executed by the computing device, for displaying, upon initiation and loading of the browsing application for operation by an operating system hosting the browsing application, the syndication feed and content from other sources within the user-specific customized home page based at least in part on user-specific configuration settings stored in server based configuration storage and retrieved based upon user authentication, wherein the sources are loaded during initiation based upon a determination of the user's interactions with the syndication feed and each source and the availability of the syndication feed and each source.

14. The non-transitory computer-readable storage medium in accordance with claim 13, wherein said code for analyzing a page of data to determine the availability of the syndication feed comprises code for searching said page for a tag indicative of the availability of the syndication feed.

15. The non-transitory computer-readable storage medium in accordance with claim 14, wherein said tag is a link tag.

16. The non-transitory computer-readable storage medium in accordance with claim 14, wherein said tag is a tag indicating the availability of an RSS feed.

17. The non-transitory computer-readable storage medium in accordance with claim 14, wherein said tag is a tag indicating the availability of an atom feed.

18. The non-transitory computer-readable storage medium in accordance with claim 13, wherein said user interface element comprises a button.

19. The non-transitory computer-readable storage medium in accordance with claim 13, further comprising a customized home page comprising a page which includes one or more search fields, one or more syndication feeds, and content from one or more web pages.

20. The non-transitory computer-readable storage medium in accordance with claim 13, wherein said page of data comprises data in a markup language.

21. The non-transitory computer-readable storage medium in accordance with claim 20, wherein said markup language is HTML.

22. The non-transitory computer-readable storage medium in accordance with claim 14, wherein said tag is a tag indicating the availability of a feed which is in an XML format.

23. The non-transitory computer-readable storage medium in accordance with claim 13, wherein said code for analyzing a page of data that has been retrieved over said network comprises a plugin to said browsing application.

24. The non-transitory computer-readable storage medium in accordance with claim 13, wherein said code for analyzing a page of data that has been retrieved over said network comprises code integrated into said browsing application at a source code level.

25. A method comprising:
  analyzing, via a computing device, a page of data that has been retrieved over a network by a browsing application determine the availability of a syndication feed;
  searching, via the computing device, source code associated with the page in order to determine that the page data supports the syndication feed;
  causing, via the computing device, a user interface element to be displayed on said browsing application based on the determination that the page data supports the syndication feed, said user interface element indicating the availability of the syndication feed;
  responding, via the computing device, to a user's selection of said user interface element by causing said browsing application to retrieve a page from a server and display the page, the page permitting said user to add said syndication feed to a user-specific customized home page having content therein from diverse user-selectable sources displayed on the user-specific customized home page based at least in part on user-specific configuration settings stored in server based configuration storage and retrieved based upon user authentication;
  displaying, via the computing device, said syndication feed and said content from the diverse user-selectable sources within the user-specific customized home page upon initiation and loading of the browsing application for operation by an operating system hosting the browsing application, said syndication feed and said content from the diverse user-selectable sources are loaded during initiation of the browsing application, wherein the diverse user-selectable sources are loaded during initiation based upon a determination of the user's interactions with each source and the availability of each source.

26. A non-transitory computer-readable medium tangibly encoded with computer executable instructions, that when executed by a computing device, perform a method comprising:
  providing a content display area for displaying content of a page retrieved over a network, the content display area being displayed outside a display area of a browsing application;
  searching source code associated with the page in order to determine that the page supports the syndication feed;
  providing a user interface element indicating the availability of a syndication feed based on the determination that the page supports the syndication feed, said user interface element being displayed outside said content display area when said page displayed in said content display area includes an indicia of the availability of the syndication feed;
  receiving a user selection via said user interface element and transmitting a request to a server, the request directing the server to subscribe the user to the syndication feed, said syndication feed is added to a user-specific customized home page that is loaded during initiation of the browsing application based at least in part on authentication of the user with the server; and displaying, upon initiation and loading of the browsing application for operation by an operating system hosting the browsing application, the syndication feed with the content display area within the user-specific customized home page based at least in part on user-specific configuration settings stored in server based configuration storage and retrieved based upon said user authentication, wherein the syndication feed is loaded during initiation based upon a determination of the user's interactions with the feed and the availability of content within the feed.

27. The non-transitory computer readable storage medium of claim 26, the request further comprising a URL for the syndication feed.

28. The non-transitory computer readable storage medium of claim 26, the request further comprising data for authenticating the user with the server.

* * * * *